May 19, 1925.
T. GONZÁLEZ Y HERNANDEZ
1,538,113
APPARATUS FOR RAISING VEHICLES
Filed June 1, 1922
2 Sheets-Sheet 1
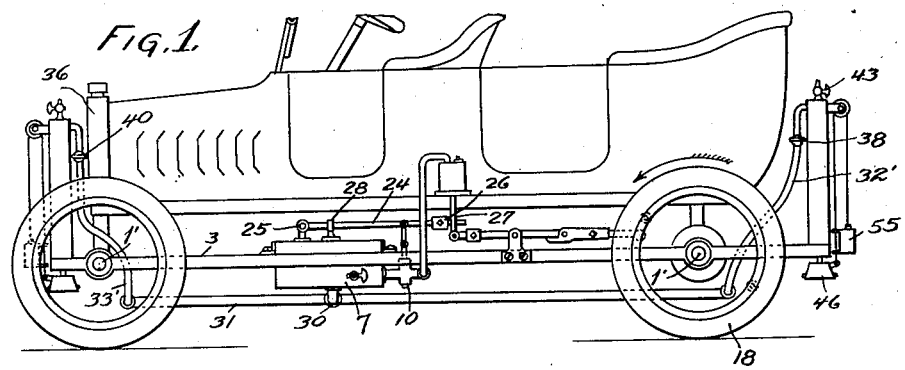
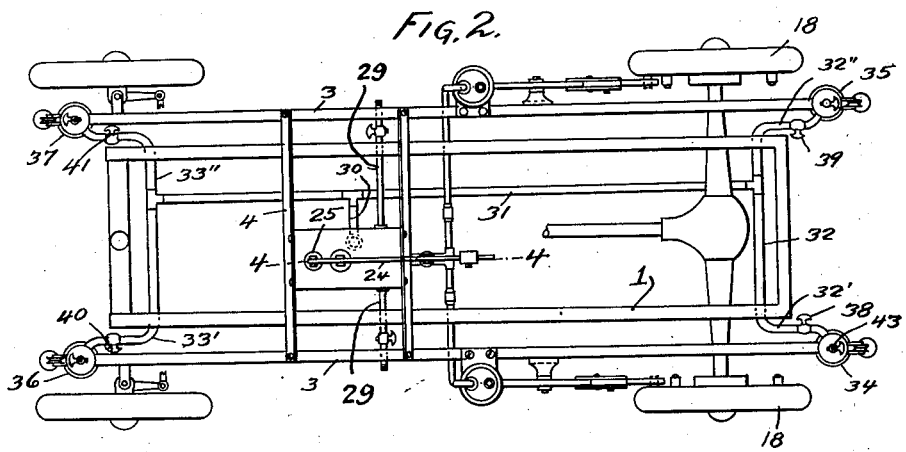
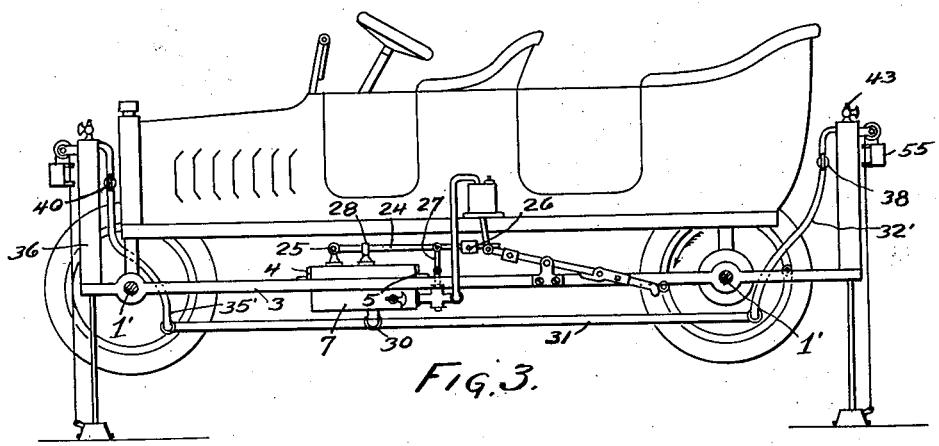
INVENTOR.
Tirso González y Hernandez,
BY B. Singer
ATTORNEY

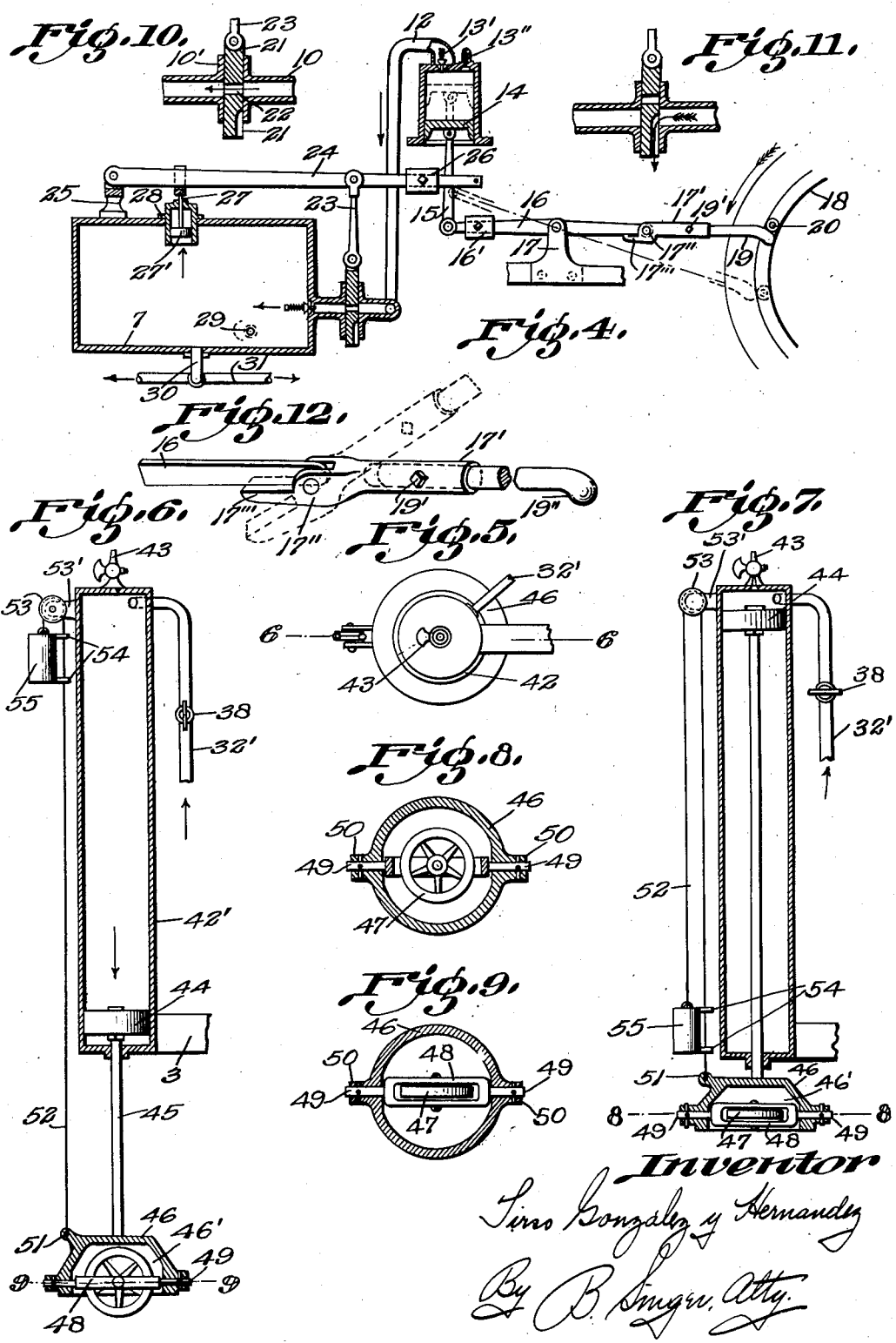

Patented May 19, 1925.

1,538,113

UNITED STATES PATENT OFFICE.

TIRSO GONZÁLEZ Y HERNANDEZ, OF SAGUA LA GRANDE, CUBA.

APPARATUS FOR RAISING VEHICLES.

Application filed June 1, 1922. Serial No. 565,173.

*To all whom it may concern:*

Be it known that I, TIRSO GONZÁLEZ Y HERNANDEZ, resident of Sagua la Grande, Santa Clara Province, Republic of Cuba, have invented certain new and useful Apparatus for Raising Vehicles, of which the following is a specification.

This invention relates to improvements in compressed air actuated means for raising automobile vehicles, the object of the invention being to provide improved apparatus of this class which is arranged to be attached to the axles of an automobile and to be carried thereby and which includes pneumatic jacks for raising and lowering the automobile and also includes air compressing means and operating means for the air compressing means which operating means is constructed and arranged to be actuated at will by the engine driven rear wheels of the automobile.

One object of the invention is to effect improvements in the construction of the frame.

Another object is to effect improvements in the construction of the pneumatic jacks.

Another object is to effect improvements in the construction of the air compressing mechanism.

Another object is to effect improvements in the construction of the automobile wheel operated means for actuating the air compressing means.

With the above and other objects in view, the invention consists in the construction, combination and arrangement of the devices hereinafter described and claimed.

In the accompanying drawings, Figure 1 is an elevation of an automobile provided with my improved apparatus.

Figure 2 is a plane of the chassis of an automobile provided with my improved apparatus.

Figure 3 is an elevation of an automobile provided with my improved apparatus and showing the automobile in raised position.

Figure 4 is a detail elevation, partly in section of the air compressing means and the vehicle wheel actuated means for operating the air compressing means.

Figure 5 is a detail plan of one of the pneumatic jacks.

Figure 6 is a detail vertical sectional view of the same on the plane indicated by the line 6—6 of Figure 5.

Figure 7 is a similar view of the same showing the jack in raised position.

Figure 8 is a detail sectional view taken on the plane indicated by the line 8—8 of Figure 6 and showing the emergency wheel in horizontal position.

Figure 9 is a similar view of the same showing the emergency wheel in vertical, operative position.

Figure 10 is a detail sectional view, on a somewhat larger scale, of the valve which regulates the admission of air to the compressed air tank.

Figure 11 is a similar view of the same in another position.

Figure 12 is a detail perspective of the operative member of the air compressing pump.

In the embodiment of my invention I provide a frame adapted to be arranged under the chassis of an automobile and which is here shown as comprising side beams 3 attached to the automobile axles 1' and cross bars 4, 5, which connect said side beams. A compressed air storing tank 7 is arranged between the beams 1 and secured at its ends to the cross bars 4, 5. In the rear end of said tank is an opening 8 in which a spring check valve 9 is normally seated. A union 10 is attached to the tank 7 and at one end is in register with the opening 8. The opposite end is connected to a pipe 12 which is also connected to the upper end of a vertical air compressing pump cylinder 13. A check valve 13' which is normally closed by a spring as shown is seated in the portion in the upper end of the pump cylinder to which the pipe 12 is connected. An air inlet valve 13" is also provided in the upper end of said pump cylinder. The piston 14 of the pump cylinder is pivotally connected to a connecting rod 15 the lower end of which is pivotally connected to the outer end of a locking lever member 16 the inner end of which is pivotally connected as at 17" to a locking lever member 19 which has a curved outer end 19" arranged to be engaged and operated by tappet rollers 20 provided on one of the rear automobile wheels 18. The member 19 is longitudinally adjustable in a connecting member 17' which is provided with a securing screw 19' and is also provided with an arm 17''' arranged to engage under the member 16. Said member is pivotally connected to a bracket 17 which is secured to the frame. Hence when the wheel 18 is driven by the engine of the vehicle in normal counter clockwise direction as each tappet roller 20 passes the end 19″ it will depress the same and thereby cause the member 19 by its engagement with the member 16 at the points 17″, 17‴ to raise the front end of said member 16 and thereby cause the same through the rod 15 to impart upward, air-compressing stroke to the piston 14, as will be understood. A weight 16′ which is adjustably mounted on the member 16 then causes said member and the piston to descend and the member 19 to be raised, the pivot joint 17″ between said member 19 and the member 16 enabling the member 19 to be raised independently of the member 16, the members 17″ and 17‴ constituting in effect a rule joint between said members 16 and 19. The union 10 is provided with a valve casing 10′ in which is mounted a vertically arranged slidable valve 21 which has a port 22 and also a relief channel 21′. When the valve is in the position shown in Figure 4, with its port 22 in registry with the port of the union 10, compressed air from the pump is forced directly into the tank 7, past the check valve line. When the valve is in the raised position shown in Figure 11, the port 22 is closed and the inner end of the channel 21′ is in communication with the end of the union which is connected to the compressed air pump so that compressed air from the pump is discharged into the outer atmosphere and not the tank. I also provide means for automatically actuating the valve 21. Said means comprises a valve piston 27′ which is arranged in a cylinder 28 that projects and opens into the upper portion of the tank 7, a lever 24 which is engaged by said rod and is pivotally mounted on a standard 25 provided on the tank and a rod 23 which is pivotally connected to the lever 24 and the valve 21. A weight 26 is adjustably mounted on the lever 24 and hence can be set to secure any desired pressure of compressed air in the tank 7 before the valve 21 is raised to released position by the action of said members 27′, 28, 27, 24 and 23.

I will now describe the pneumatic jacks which I employ for raising and lowering the automobile. Each of these jacks comprises a vertical cylinder 42 secured at the lower end on one end of one of the bars 3 and provided with a relief valve 43 at the upper end and with a piston or plunger 44.

The piston rod 45 passes through an opening in the bottom or lower head of the cylinder and it is secured at its lower end to a casing 46 which is hollow in the under side to provide a chamber 46′ and which casing in effect forms the base of the foot of the jack. In the chamber 46′ is arranged an emergency wheel or caster wheel 47 which is mounted in a frame 48, said frame being provided at the front and rear ends with trunnions 49 which are mounted in bearings with which the base is provided. By turning the frame the wheel 47 may be arranged in horizontal position, as shown in Figure 6, and entirely within the chamber 46′ or may be arranged in vertical position so as to extend below the base and to bear on the ground as shown in Figure 7. When in such position the wheels 47 of the various jacks will enable the automobile to be moved as may be desired over the floor or ground. Removable pins 50 are provided which may be inserted in openings in the bearings and in the trunnions to secure said wheels and frames 48 in either position as will be understood. Each cylinder 42 is provided near the upper end with an outstanding bracket arm 53′ on which is mounted a pulley 53. A cable or cord 52 passes over the pulley, has one end attached to the base 46 as at 51 and is provided at the opposite end with a weight 55. Said weight has guide lugs 54 through which the inner lead of the cable passes as shown. A union 30 is connected to the tank 7 and to a pipe 31. Said pipe is connected to pipes 32, 33, said pipes being provided at their ends respectively with branch arms 32′, 32″, 33′ and 33″ which branch pipes are respectively provided each with cocks 38, 39, 40 and 41. The pneumatic jacks are respectively indicated on the drawings at 34, 35, 36 and 37.

The tank 7 is provided with a nipple 29 having a control valve, to which nipple a rubber tube may be attached to enable compressed air from the tank to be employed in inflating the tires of the automobile wheel.

The operation of the invention is as follows:

When the vehicle is in motion, the rollers shown in dotted lines in Fig. 4, by engagement with the hinge 19″ cause the member 19 and the lever 16 to be operated as indicated in dotted lines in Fig. 4 and thereby operate the piston 14 and cause air to be compressed and to be stored in the tank 7. This operation continues until the pressure in the tank is such as to cause the valve piston 27′ to raise the lever 24 and the weight 26, thus raising the cut-off valve 21 and causing its port 22 to be out of communication with the member 10 and its channel 21′ to be brought into communication with the air compressing cylinder 13. Thereafter the air compressing pump 13 will continue to operate ineffectually. Any suitable means will in practice be provided to hold the member 19′ out of the path of the rollers 20 when it is not desired that the air compressing pump shall operate.

In order to raise the vehicle, the cocks 38, 39, 40 and 41 must be open to permit compressed air to enter the upper ends of the cylinders 34, 35, 36, 37 and thus cause the pistons therein to be forced downwardly relatively to the cylinders and after the edges at the lower ends of the piston rods come into contact with the ground or floor, such relative movement will cause the vehicle together with the apparatus including the said cylinders to rise, as will be understood. If any of the vehicle wheels should require attention, say the one corresponding to the arrangement 34, the pulley casing 48 which is carried by the wheel 47 should be turned before admitting the air into the cylinder to brace said wheel in a vertical position and thus cause said wheel to take the place of the damaged wheel in supporting the car. When the vehicle is thus raised, the cocks which control the admission of the compressed air into the cylinders of the jacks will be closed and hence the car will be continued to be held in raised position. When it is desired to lower the car, the valves at the upper ends of the jack cylinders will be opened to admit the escape of the compressed air therefrom, whereupon the jacks together with the vehicle will descend until the edges reach the ground and thereafter the weights connected to the pistons and heads of the jacks will raise the same above the ground, as will be understood.

While I have hereinbefore described a preferred form of my invention I would have it understood that changes may be made in the form, proportion and construction of the several parts without departing from the spirit of my invention as defined in the appended claims.

Having thus described my invention I claim:

1. An automobile jack comprising a frame arranged for attachment to an automobile chassis to be carried thereby, a pneumatic jack mounted on said frame and means including an automobile wheel actuated mechanism to compress air and supply compressed air to the jack.

2. An automobile jack comprising a frame arranged for attachment to an automobile chassis to be carried thereby, a pneumatic jack mounted on said frame and means including an automobile wheel actuated mechanism to compress air and supply compressed air to the jack, said jack including a standard element provided with a caster wheel mounted for movement therein into and out of operative position.

3. An automobile jack comprising a frame arranged for attachment to an automobile chassis to be carried thereby, a pneumatic jack mounted on said frame and means including an automobile wheel actuated mechanism to compress air and supply compressed air to the jack, said pneumatic jack including a standard element and yieldable means to raise said standard element when air is exhausted from said jack.

4. An automobile jack comprising a frame arranged for attachment to an automobile chassis to be carried thereby, a pneumatic jack mounted on said frame, air compressing means to supply the jack also mounted on said frame and including a lever having a rule joint and a wheel actuated member, and a tappet on one of the automobile wheels coactive with said member to oscillate said lever and thereby operate said air compressing pump.

5. An automobile jack arranged for attachment to a frame mounted on an automobile chassis to be carried thereby, a compressed air tank and air compressing means also arranged to be attached to the said frame, an air connection between the tank and the jack to enable the latter to be operated by compressed air, a valve to control the supply of compressed air to the tank by the air compressing means and means to operate said valve and including an operating element actuated by compressed air in the tank.

In witness whereof I affix my signature.

TIRSO GONZÁLEZ y HERNANDEZ.